C. W. KING.
ADVERTISING DEVICE.
APPLICATION FILED DEC. 13, 1920.
1,396,640.
Patented Nov. 8, 1921.
3 SHEETS—SHEET 1.
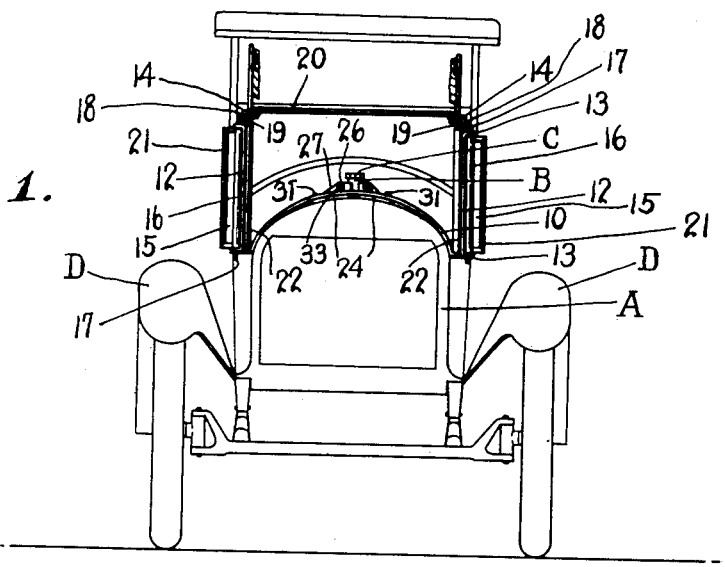
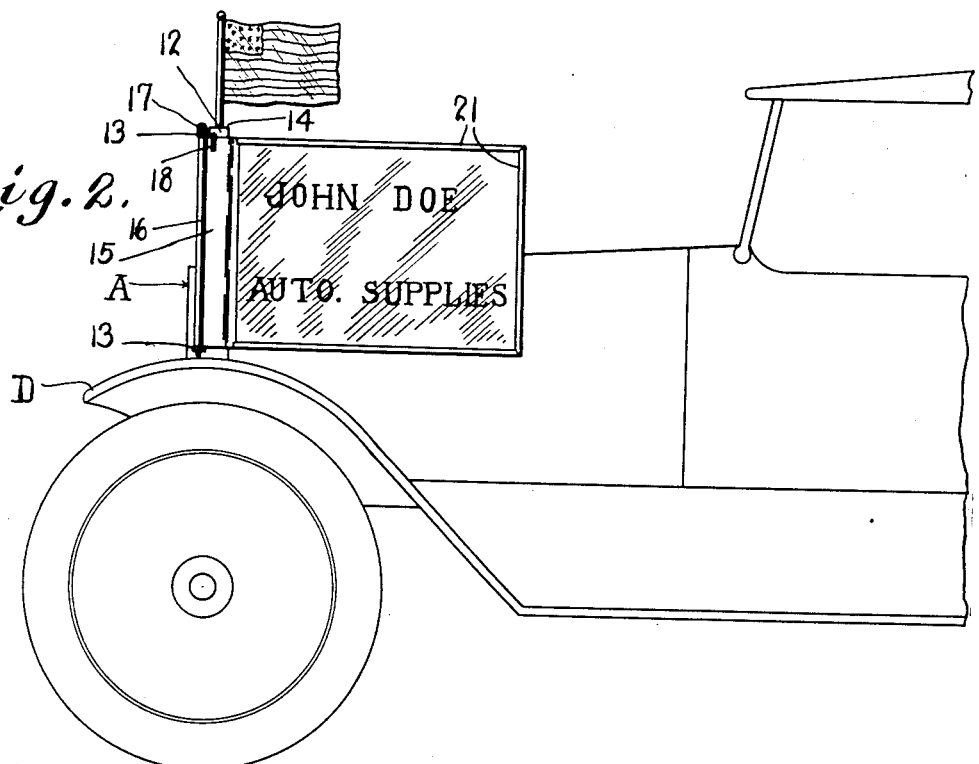

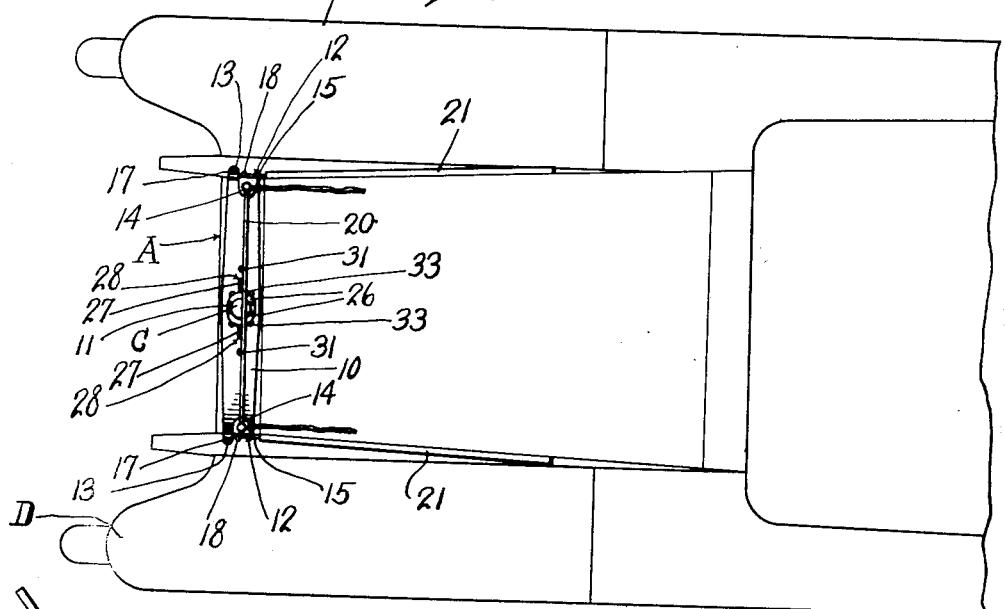
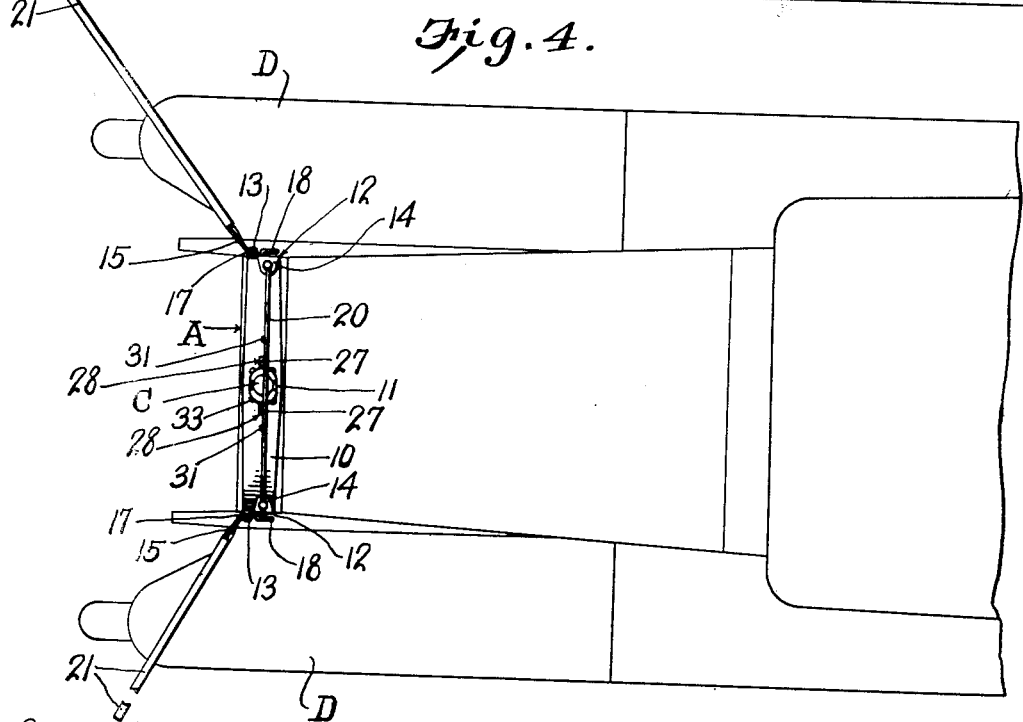

C. W. KING.
ADVERTISING DEVICE.
APPLICATION FILED DEC. 13, 1920.
1,396,640.
Patented Nov. 8, 1921.
3 SHEETS—SHEET 3.
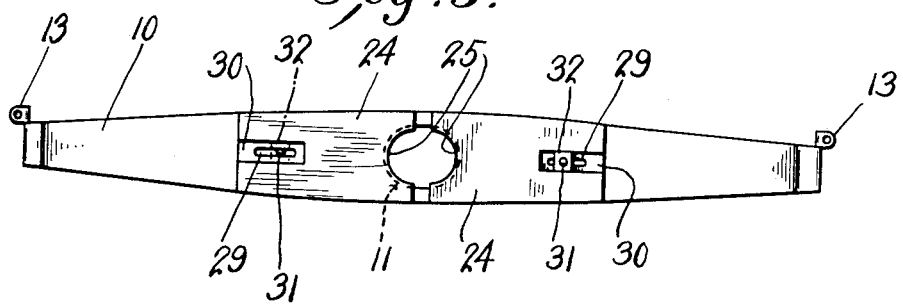
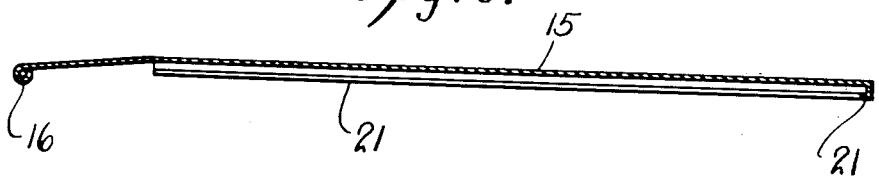
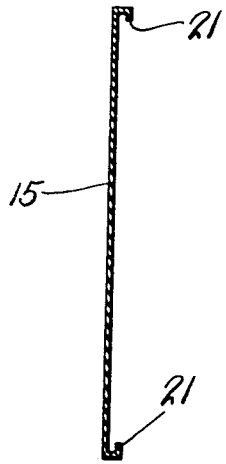
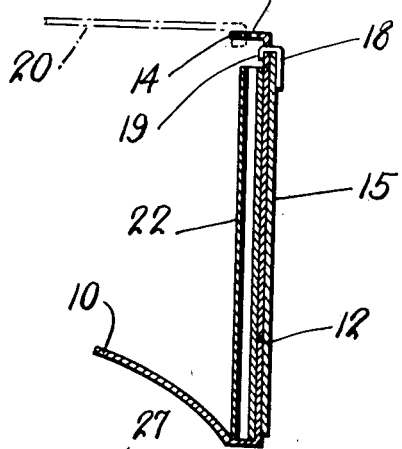
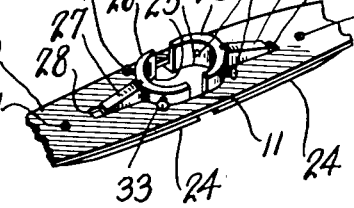
C. W. King
INVENTOR
ATTORNEY

UNITED STATES PATENT OFFICE.

CHARLES W. KING, OF ST. LOUIS, MISSOURI.

ADVERTISING DEVICE.

1,396,640.  Specification of Letters Patent.  Patented Nov. 8, 1921.

Application filed December 13, 1920. Serial No. 430,315.

*To all whom it may concern:*

Be it known that I, CHARLES W. KING, a citizen of the United States, residing at St. Louis, in the county of St. Louis City and State of Missouri, have invented new and useful Improvements in Advertising Devices, of which the following is a specification.

This invention relates to display devices and has for its object the provision of a device adapted to be secured upon the radiator neck of an automobile and provided with supports for holding placards or any advertising matter desired so as to efficiently and attractively display the same, the device being furthermore provided with socket members for holding flags and the like.

An important object is the provision of a device of this character which is so constructed that it is engageable upon radiator necks of widely different sizes.

Another object is the provision of a device of this character in which the placard supporting members are so disposed and mounted that they may be swung forwardly so as not to interfere with opening or closing of the hood of the automobile in case of necessity.

An additional object is the provision of a device of this character which will be simple and inexpensive in construction, easy to mount, efficient and attractive in use, durable in service, and a general improvement in the art.

With the above and other objects and advantages in view, the invention consists in the details of construction to be hereinafter more fully described and claimed and illustrated in the accompanying drawings in which—

Figure 1 is a front elevation of my device in position upon an automobile,

Fig. 2 is a side elevation thereof,

Fig. 3 is a top plan view, showing the parts in normal position,

Fig. 4 is a similar view showing the placard supporting members swung forwardly in non-obstructing relation to the hood, Fig. 5 is a bottom plan view showing the adjustment feature, Fig. 6 is a horizontal sectional view through one of the placard supporting members, Fig. 7 is a vertical cross sectional view therethrough, Fig. 8 is a detail longitudinal sectional view through the main supporting arm, and Fig. 9 is a detail perspective view showing the means for locking the device upon the radiator filling neck.

Referring more particularly to the drawings, the letter A designates the radiator of an automobile, B designates the filling neck thereof, C designates the head, and D designates the front fenders. In carrying out my invention I provide a transverse bar 10 which is preferably arcuate in form and which is formed with an elliptical central opening 11. Formed or secured upon the ends of this bar 10 are upright members 12 which are formed at their upper and lower edges with outwardly extending ears 13. Also formed at the upper ends of these uprights 12 are inwardly extending ears 14.

Associated with each upright 12 is a placard support which might be a frame if preferred but which is here shown as a rectangular plate 15 having one end coiled to provide a bearing 16 within which is engaged a pintle 17 passing through the ears 13. By this construction it will be seen that the plates 15 are hinged with respect to the uprights so that they may be swung forwardly or rearwardly as occasion may demand. Associated with the upper end of each upright is a U-shaped clip-like member 18 which has its bight portion rotatable with respect to the upright and which has one arm 19 engaging against the inner face of the upright and the other arm engageable with the outer face of the plate. When these clip members are in vertical position the plates are locked against swinging movement but when the clips 18 are moved upwardly out of engagement with the plates 15 the plates may be swung forwardly, as clearly shown in one of the figures. The numeral 20 designates a rod which connects the ears 14 for the purpose of bracing the structure. The signs or other material to be displayed may be painted upon the plates 15 or may be in the nature of cards secured upon the plates 15 in some suitable way, not shown. It is, however, preferable that the plates 15 be formed at their upper, lower, and rear marginal edges with flanges 21 which serve as stiffening means and it is to be noted that if preferred, these flanges might be formed as retainers for gripping the edges of cards or other display matter.

Secured against the inner faces of the uprights 12 are tubular sockets 22 which register with holes 23 in the ears 14 and which are for the reception of the staffs of flags or pennants.

In order that the device may be properly secured upon a radiator neck, I provide a pair of plates 24 disposed upon the underside of the bar 10 and having their adjacent edges formed with substantially semi-circular recesses 25. The recessed ends of the plates are formed with upstanding flanges 26 which are disposed through the elliptical opening 11 and which carry webs or ribs 27 fitting within slots 28 in the bar 10 at opposite ends of the opening 11 therein. The outer end portions of the plates 24 are formed with slots 29 located within recesses 30 and these slots are for the passage of bolts 31 which pass through circular holes in the bar 10 and which carry clamping nuts 32 whereby the plates 24 may be adjusted toward or away from each other for engagement upon radiator necks of different diameters. Extending through the flanges 26 are suitable set screws 33 engageable with a neck B for securely clamping the device in position.

With the device constructed and assembled as above described, it will be seen that its mode of attachment to the radiator neck involves but a very simple operation. When the device is properly installed it will be seen that the placard carrying plates 15 will be disposed at the sides of the radiator but above the fenders so that they will be clearly visible. By swinging the clip members 18 to permit the plates 15 to be swung forwardly it will be seen that they will be out of the way so as not to interfere with opening of the hood for any reason. It is to be noted that the device is strong and will not in any way deface the automobile and will be very attractive in use.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention, I claim:

1. A device of the character described comprising a bar adapted for connection at its center with the filling neck of a radiator, clamping means carried by said bar and engageable with the filling neck of a radiator, uprights at the ends of said bar, plate members pivoted upon said uprights and adapted to bear display matter, a cross bar connecting the upper ends of said uprights whereby to hold them rigid, and means for locking said plates with respect to said uprights.

2. A display device comprising a bar adapted for connection at the center with the filling neck of a radiator, uprights at the ends of said bar, plate members pivoted upon said uprights and adapted to bear display matter and means for locking said plates with respect to said uprights comprising clips engageable with the uprights and with the outer faces of the plates.

3. A display device comprising a bar adapted for connection with the filling neck of a radiator, uprights at the ends of said bar, plate members pivoted upon said uprights and adapted to bear display matter, and means for locking said plates with respect to said uprights comprising U-shaped clips having their bight portions journaled through the uprights and having one arm engaging against the inner face of the upright and the other arm engaging with the outer face of the plate.

4. A device of the character described comprising a bar provided with a relatively large central opening, a pair of plates slidably mounted upon the underside of said bar and movable toward or from each other, said plates having their adjacent ends curved for engagement against the filling neck of a radiator, clamping screws carried by the adjacent ends of said plates, upright members at the ends of said bar, and display members carried by said uprights.

5. A device of the character described comprising an elongated bar provided at its center with an opening adapted to be disposed over the filling neck of a radiator, a pair of plate members slidable along said bar and having curved cut-away ends adapted to embracingly engage the radiator neck whereby to secure the bar with respect to the latter, uprights rising from the ends of said bar, a rod connecting the upper ends of said uprights, and rearwardly diverging plate members carried by said uprights and adapted to carry advertising or display matter.

6. A device of the character described comprising an elongated bar provided at its center with an opening adapted to be disposed over the filling neck of a radiator, a pair of plate members slidable along said bar and having curved cut-away ends adapted to embracingly engage the radiator neck whereby to secure the bar with respect to the latter, uprights rising from the ends of said bar, a rod connecting the upper ends of said uprights, rearwardly diverging plate members carried by said uprights and adapted to carry advertising or display matter, and clip devices engaging said plates whereby to hold them against movement with respect to the uprights.

In testimony whereof I affix my signature.

CHARLES W. KING.